United States Patent [19]

Rich

[11] Patent Number: 4,910,369

[45] Date of Patent: Mar. 20, 1990

[54] CONDITIONING SYSTEM FOR WATER BASED CAN SEALANTS

[75] Inventor: Samuel W. Rich, Needham, Mass.

[73] Assignee: W. R. Grace & Co.-Conn., Lexington, Mass.

[21] Appl. No.: 335,624

[22] Filed: Apr. 10, 1989

[51] Int. Cl.[4] .................. B01D 29/00; B01D 35/18
[52] U.S. Cl. .................. 210/90; 210/96.1; 210/137; 210/143; 210/181; 210/182; 210/258
[58] Field of Search .............. 210/90, 96.1, 137, 143, 210/167, 181, 182, 195.1, 251, 258

[56] References Cited

U.S. PATENT DOCUMENTS

| | | | |
|---|---|---|---|
| 2,425,848 | 8/1947 | Vawter | 210/167 |
| 3,222,866 | 12/1965 | Lehmann | 210/167 X |
| 3,483,982 | 12/1969 | Nelson | 210/167 |
| 3,786,921 | 1/1974 | Johnson | 210/181 X |
| 4,102,304 | 7/1978 | Debenham | 118/421 |
| 4,224,154 | 9/1980 | Steininger | 210/143 X |
| 4,332,679 | 6/1982 | Hengst et al. | 210/90 |
| 4,352,712 | 10/1982 | Paul | 156/540 |
| 4,562,088 | 12/1985 | Navarro | 427/8 |
| 4,565,638 | 1/1986 | Zucker | 210/90 X |
| 4,592,690 | 6/1986 | Busch | 413/19 |
| 4,657,670 | 4/1987 | Newton | 210/143 X |
| 4,702,827 | 10/1987 | Wenzel | 210/167 X |
| 4,724,795 | 2/1988 | Levine | 118/688 |
| 4,762,618 | 8/1988 | Gummesson et al. | 210/137 X |
| 4,787,332 | 11/1988 | Geisel et al. | 118/692 |
| 4,792,078 | 12/1988 | Takahashi | 228/8 |
| 4,804,464 | 2/1989 | Schevey | 210/137 X |

FOREIGN PATENT DOCUMENTS 562298  8/1977  U.S.S.R. .................. 210/96.1

Primary Examiner—Robert Spitzer
Attorney, Agent, or Firm—John Dana Hubbard; William L. Baker

[57] ABSTRACT

A conditioning system for water based can sealing compounds comprising a downstream pressure regulator adjacent a double diaphragm pump, a filter and a heater wherein the exit of the heater is connected to a lining nozzle, and exit line from the nozzle connected to an upstream pressure regulator and a return line meeting the supply line between the downstream pressure regulator and the pump. Additionally, one or more dampeners may be added to the system as well as various pressure gauges and other sensors. The system without dampeners controls film weights to within ±5% of the desired amount. The use of one or more dampeners improves film weight control to within ±3% of the desired amount.

13 Claims, 1 Drawing Sheet

CONDITIONING SYSTEM FOR WATER BASED CAN SEALANTS

The present invention relates to a system for conditioning water based can sealants. More particularly, it relates to a system for controlling the film weight of a water based can lining compound in a lining system.

BACKGROUND OF THE INVENTION

There are two basic groups of can lining compounds in use today; solvent based and water based.

Solvent based compounds comprise a rubber based can lining compound dissolved and/or dispersed in one or more solvents. After the compound is lined onto a can end, the solvent is driven off to leave a resilient gasket.

Water based compounds are similar, however the compounds are dispersed and/or emulsified in water rather than a solvent. These materials therefore avoid the problems normally associated with solvents, such as pollution, flammability, and health effects.

Typically, both compounds are supplied under pressure to a lining nozzle. A can end, mounted to a rotary chuck below the nozzle, is rotated at a set speed. The nozzle is opened for a length of time sufficient to apply the required amount of compound to the can end.

The key to obtaining an acceptably lined can end is the sufficient and consistent deposition of compound as defined by the film weight and placement of the compound on the end. Film weight is the amount of compound that is applied to each can end. If too much is applied, the excess compound could distort the seal causing leakage, compound is wasted and the profitability suffers. If too little is applied, the end is rejected as it will not form a proper seal.

Film weight can be approximately determined by the following equation:

$$F_W \alpha \int_0^t \frac{PD^4}{\eta L}$$

where FW is film weight, P is the pressure difference between that contained within the lining system and the atmospheric air pressure, D is the diameter of the lining nozzle orifice, $\eta$ is the viscosity of the compound as it flows through the nozzle, L is the lead length of the nozzle, and t is the lining time. This equation has been simplified and does not take into account other variables such as the wear of the nozzle, the configuration of the inside surface of the nozzle (tapered, etc.), the height to which the nozzle needle is lifted during lining, transient flow response from needle opening/closing, and elastic response of the compound. However, these variables are secondary in their effect and can, for purposes of this discussion, be ignored.

For a manufacturer of can ends, D and L are fixed for a given nozzle. Pressure and viscosity tend to vary depending on environmental effects on the system. Pressure and viscosity must be controlled and held constant in order to obtain consistent and sufficient film weights.

In solvent systems, the pressure and temperature are regulated by a "conditioner". This conditioning system comprises a rotary gear pump, a filter and a heater connected to the supply side of a lining nozzle and a back pressure regulator or pinch valve connected between the exit side of the nozzle and the gear pump. Gear pumps have steady flow and discharge pressure. Constant pressure in the system is required to maintain consistent film weight. In order to preclude a fluctuation in pressure each time the lining nozzle is opened, the recycle system is designed to recirculate large amounts of compound, usually 40 to 50 times the amount discharged through the nozzle. The heater is thermostatically regulated such that the temperature of the compound in the conditioner is closely controlled. As a consequence the compound viscosity, which is temperature sensitive, is accurately maintained. If the lining system should become inoperative for an extended period of time, the compound could make hundreds of passes through the recycle system. This amount of recycling is not a problem for solvent based compounds which are generally thermodynamically stable products.

However, water based compounds, being emulsions and/or dispersions, are not thermodynamically stable. Water based compounds require the use of surface active agents or protective colloids to maintain the compound in a usable state until lined.

The close clearances associated with rotary pumps cause a great amount of shear stress on water based compounds which destabilizes the compound, thus precluding the use of a conditioning system as is used in solvent based compounds.

This inability to condition water based compounds causes problems to the can end manufacturer in controlling and obtaining a consistent film weight. Fluctuations in ambient temperature which frequently occur on a daily basis, shutdowns during which the viscosity of the compound increases and the inability to hold the compound at a constant pressure precludes can end manufacturers from controlling film weights at +/− 10% of the desired weight, which is the standard for solvent based compounds. Field experience has shown that controlling film weights even at +/− 15% of the desired weight is often difficult to achieve with water based compounds.

The present invention overcomes the difficulties encountered with lining water based compounds and greatly improves the film weight control of water based compounds.

SUMMARY OF THE INVENTION

The present invention is a system for conditioning water based compounds such that consistent film weights can be applied to can ends. The system comprises a downstream regulator connected to the compound supply, a pump connected to the opposite side of the downstream regulator, a filter and a heater connected between the pump and the lining nozzle, and a back pressure regulator connecting the exit port of the lining nozzle to the inlet of the pump. The preferred embodiment uses a double diaphragm pump and contains two pressure pulsation dampeners, one located downstream from the pump and the other located downstream from the back pressure regulator. The conditioning system of the present invention allows film weight control within +/− 5%. The preferred embodiment of the present invention provides even further control to within +/− 3%.

IN THE DRAWINGS

DETAILED DESCRIPTION OF THE INVENTION

Figure 1:
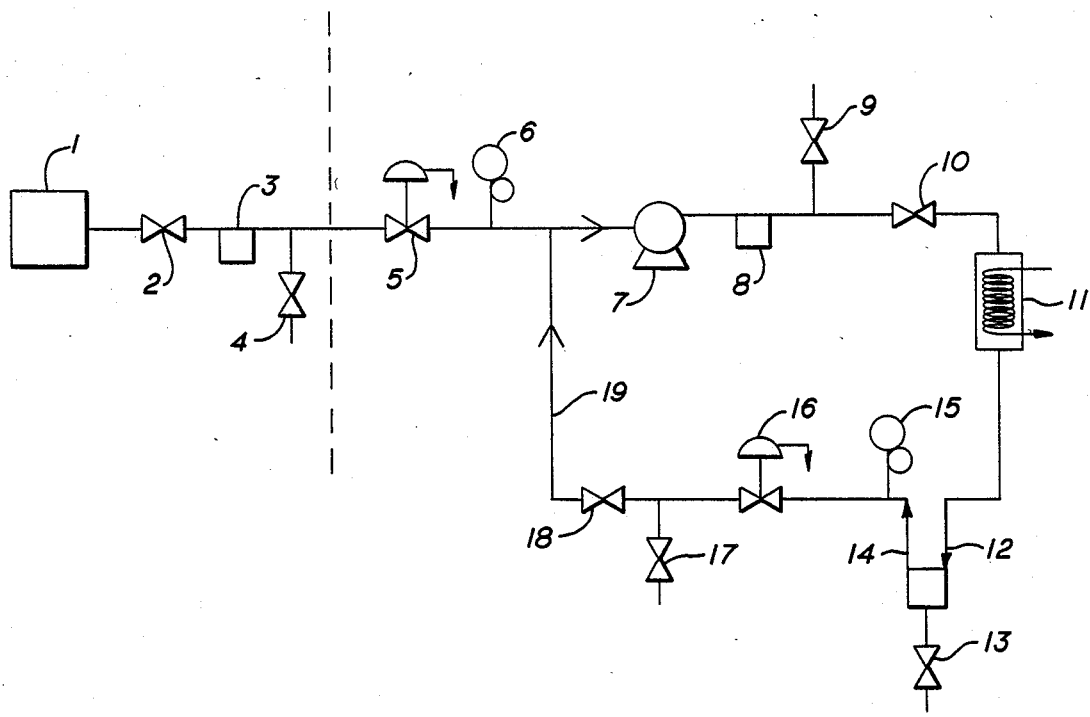
FIG. 1 is a representation of an embodiment of the present invention.

FIG. 1 shows an embodiment of the present invention. The details to the left of the dotted line represent the can end manufacturer's plant. A supply 1 of compound from the manufacturer's storage is passed through a valve 2 and filter 3 and past drain valve 4 and into the conditioning system. A first pressure regulation means 5, preferably a downstream regulator is provided near the connection of the supply to the system. A means for sensing pressure in the system, preferably a pressure gauge 6 is located downstream from the regulation means 5. A pumping means 7, preferably a diaphragm type pump is located downstream from the pressure gauge 6. The pumping means discharges into a filtering means 8 for collecting coagulum that may form in the system. A drain valve 9 and a valve 10 are located between the filtering means 8 and a temperature controlling means 11 for the compound. The temperature controlling means is connected to an inlet port 12 of a lining nozzle 13. The compound which is not lined through the nozzle 13 is discharged through an outlet port 14. A pressure gauge 15 located downstream of the outlet port 14, monitors the lining pressure of the system. A second pressure regulation means 16 is located downstream from the pressure gauge 15. Preferably, it is a back pressure regulator, although a pinch valve or other restriction may be used as well. An additional drain valve 17 and valve 18 are located downstream from the second pressure regulation means 16 and are connected to the system between the first pressure regulation means 5 and the pump 7 by a return line 19. All of the various components are connected to each other by appropriate conduit means such as metal or plastic tubing or piping.

The system maintains the pressure and viscosity of the compound at constant and consistent levels. By doing so, the film weight of the lined compound is maintained at +/− 5% of the desired weight. It is believed that most of the dampening of the pressure fluctuations which occur in the system is through the viscous damping effect of the components themselves. An additional advantage of the system is that lining pressure can be varied as desired or required by a simple adjustment to the second pressure regulation means. This system provides a three fold increase in the ability to control film weights as compared with lining nozzles that do not have such a system.

Figure 2:
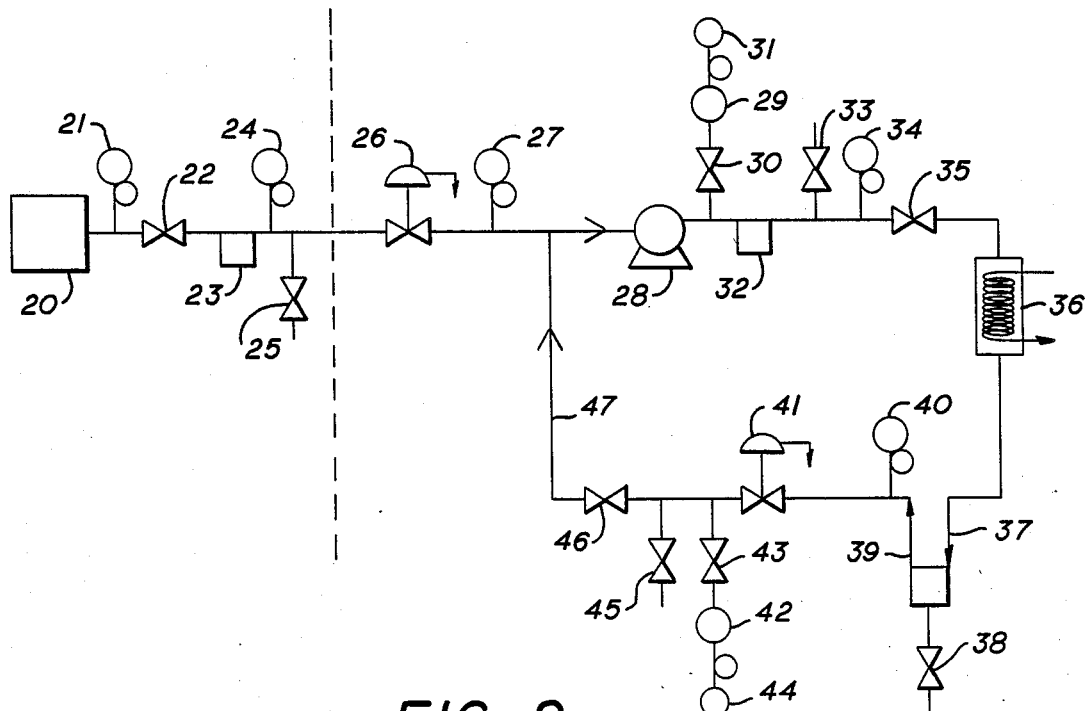
FIG. 2 is a representation of the preferred embodiment of the present invention.

FIG. 2 shows a preferred embodiment of the present invention connected to a can end manufacturer's equipment. The supply 20 is connected to a pressure gauge 21 which connected to a valve 22 and a filter 23. A second pressure gauge 24 is located downstream of the filter 23 and adjacent a drain valve 25. The use of gauges 21 and 24 allows one to monitor the function of the filter 23.

A downstream pressure regulator 26 is connected to the manufacturer's supply line. This regulator is upstream of a pressure gauge 27, the pump 28 and the return line 47 from the nozzle 38. The pump 28 is then connected to a first dampening means 29 for damping any pressure fluctuations caused by the pump 28 or other components in the system. The dampening device 29, as shown, may be attached by a valve 30 so that it may be selectively actuated as desired and easily removed should the device require maintenance. Preferably, a pressure gauge 31 is mounted to the dampening means 29. A filter 32 is located beyond the dampening device. A drain valve 33 and valve 35 are used to control the flow of the system as required. A pressure gauge 34 is located between the valves 33 and 35 to monitor filter function. Beyond the valve 35 is a heater 36 for warming the compound to the desired temperature. The function of the heater is to maintain a constant compound temperature in the event of an ambient temperature variation in the plant. The heater 36 is connected to the inlet port 37 of the lining nozzle 38. Unlined compound is circulated through the nozzle 38 and out exit port 39. Lining pressure is monitored by pressure gauge 40. The pressure of the system is regulated by the back pressure regulator 41 adjacent the pressure gauge 40. A second dampening means 42 is connected by a valve 43 downstream from the back pressure regulator 41. As shown, the preferred dampening means has a pressure gauge 44 attached to it for monitoring of the dampening system. A drain valve 45 and a valve 46 are located downstream from the second dampening means 42 and are used to control the flow of the system. A return line 47 is attached to the system between the downstream regulator 26 and the inlet side of the pump 28 to allow for the recirculation of compound.

The pumping means of the system is a pump, the moving parts of which operate at relatively low velocities and which have large clearances so as to have little shearing effect on the compound as it circulates through the system. This prevents the viscosity and stability of the compound from being adversely affected as it is cycled. A Preferred pump is a diaphragm type pump. More preferably, it is a double diaphragm type of pump.

In addition to the low shear imparted to the compound, diaphragm pumps are preferred as they do not exhibit seal problems due to friction and wear as is common with piston type pumps, progressive cavity pumps, lobe pumps, etc. which can be used to pump water based compounds. Additionally, these pumps, particularly double diaphragm pumps, tend to generate smaller pressure pulsations, thus reducing the pressure fluctuation that must be damped. Lastly, because of the mild shearing stresses these pumps do not tend to form coagulum which could block the system.

Preferably, the selected pump has a low volumetric displacement/stroke so as to further minimize the magnitude of the pulsations. Additionally, the chosen pump should be selected so that it can cycle a sufficient volume of compound through the system to avoid significant fluctuations in the circulation compound volume due to the discharge of compound at the nozzle. The pump preferably should be able to cycle a volume of compound that is from about 10 to 60 times the amount of compound discharged through the nozzle. Typically, this would require a pump capable of pumping 0.1 to 0.6 gallons/minute.

Additionally, the preferred pump will have diaphragms made from polytetrafluoroethylene or other flexible materials with a low coefficient of friction and a body formed from plastic such as polypropylene so as to reduce the tendency for having coagulum that might be formed to remain inside the pump.

One such pump is sold by Yamada American, Inc. While the named pump is air actuated, other mechanically or electrically driven pumps could also be used.

The filter may be any filter commonly used in compound lining equipment including basket type filters, pleated filters, etc. Preferably, the filter used in the system consists of a stainless steel wire mesh screen having a mesh opening of 40 per inch and which is contained within a basket type housing. Such a filter can be obtained from The Kraissl Co. of Hackensack, N.J.

The first pressure regulating means is a downstream pressure regulator, e.g., a regulator that senses the pressure of the fluid downstream from its position and actuates according to changes in that pressure. This regulator tends to reduce pressure fluctuations that may be received from the can end manufacturer's supply system, thus helping to decrease the magnitude of the pressure pulse received by the pump. Such a regulator is commercially available from the Aro Corporation of Bryan, Ohio.

The second pressure regulation means is a back pressure or upstream pressure regulator. It operates in a manner similar to that of the downstream regulator, except it responds to the pressure changes of the compound upstream from the regulator. In this instance, the back pressure regulator responds to changes in the line pressure between itself and the exit port of the lining nozzle. Alternatively, a pinch valve or other restriction may be used instead of the second pressure regulator.

A suitable back pressure regulator is also available from the Aro Corporation.

The purpose of the pressure regulators is to maintain the lining pressure of the system at a constant value. The preferred size of the regulator should be matched to the desired range of operating pressure and the desired flow rate of the compound in the system.

The pair of regulators have a synergistic effect on each other and the system. It has been found that should the first regulator lose sensitivity, the other regulator is able to compensate and regulate the pressure within the system.

The means for controlling the temperature of the compound is preferably a heater with a controller having a variable set point. More preferably, the heater comprises a tube through which the compound circulates and which is heated from the outside by fluids, hot air, electrical resistance and other well known heating means. One such heater comprises a flexible tube, formed of polytetrafluoroethylene or other such materials with a low coefficient of friction so as to reduce the chance of coagulum being trapped in the heater, which is surrounded by a jacket having heating wires or coils mounted therein. Such a heater is capable of raising the temperature of a compound in the system by 20° F. above the outside ambient temperature within 30 minutes without excessive jacket temperatures and maintaining that temperature while the system is in operation One such heater is available from Omni Systems of Frenchtown, N.J. and comprises a 3 foot tube of ⅜ inch (internal diameter) hose formed of polytetrafluoroethylene. The hose is surrounded by a jacket having electrical heaters (30 watts per foot) and is thermostatically controlled.

The first and second damping means are preferably pressure surge suppressors which minimize and even out pressure fluctuations in the system. The preferred surge suppressor has a bladder that separates a chamber into two parts and a regulator for the introduction of air into the upper portion of the chamber. Compound from the system flows into the lower portion of the chamber. As the level of the fluid moves up and down in the chamber due to pressure fluctuations, the regulator acts to permit air to flow into the upper portion of the chamber as is required to damp the pressure pulsation.

Other types of surge suppressors or pressure dampeners may be known and are useful in the present invention.

The damping means in FIG. 2 is shown with a pressure gauge. While it is preferable that the dampener have such a gauge, it is by no means required One suitable dampener is sold by Wilden Pump and Engineering under the name Blacoh Sentry II (automatic version).

It is preferred that two dampeners be used in the present system, although it has been found that one dampener located on the downstream side of the pump is sufficient. The additional dampener located downstream from the back pressure regulator tends to minimize any water hammer effect that might occur to the pump by the pressurized feed of compound. This tends to increase the efficiency of the system and extend the useful life of the pump.

It is preferred that each of the components of the system be connected by easily detachable means such as threaded couplings, etc. to allow disassembly of a portion of the system when maintainance or repairs need to be made.

The piping or tubing used in transporting the compound through the system can be constructed of any material that is commonly used with water based compounds. The tubing should be inert to the compound, strong, long lasting and preferably inexpensive. Typical materials include steel, particularly 304 stainless steel, aluminum and various plastics such as CPVC (chlorinated polyvinyl chloride) and high pressure polypropylene pipe and fittings. These plastics are preferred as they do not lose appreciable strength at the temperatures encountered in the system.

The system may also contain various pressure sensors and/or temperature sensors which may be displayed upon a control board so as to allow an operator to determine the exact condition of the system at any time. If desired, such sensors can be wired to an alarm so that if a malfunction occurs, the operator is instantly notified and remedial action can be taken.

Once the system has been connected to the manufacturer's supply line and lining nozzles and provided with the appropriate electrical and pressurized air supplies, the system is purged of air, filled with compound, and brought to operating temperature and pressure.

The system is then essentially automatic and should only be monitored for changes. Changes in compound temperature and thus compound viscosity are obtained through varying the temperature of the heater. Changes in lining pressure are obtained through adjustments to the back pressure regulator.

Compound from the supply will be drawn, as needed by the system, through the downstream regulator and into the pump. The compound then flows through the first dampener, filter and heater to the lining nozzle. There a portion of the compound is discharged onto the can end. The remaining compound is recycled to the pump where it begins its next cycle.

In the event that the lining nozzle is closed for an extended period of time, such as may occur when the supply of ends to be lined is interrupted, the conditioner system may continue to circulate compound without any deleterious effect on the compound viscosity or other properties and will, upon restarting of the lining nozzle, provide consistent film weights to the can ends. In the embodiment of FIG. 2, a commercial compound was cycled through the system for 42 hours without draw off (approx. 2000 cycles). The reduction in viscosity of the compound was insignificant. Mechanical stability and other lining characteristics of the compound were essentially unchanged. This test represented an abnormal and extreme situation. Most shutdowns will last from 10 minutes to a few hours and under these circumstances, negligible change in viscosity of the compound will occur. If desired, one can alternatively shut down the conditioning system when the lining equipment is inoperative and activate the system when the lining equipment is started again. For particularly sensitive compounds, it may be prudent to do so.

The present invention provides several advantages to the manufacturer of can ends.

Most importantly, it provides improved film weight control without compromising the mechanical stability, flow and sealing properties of the compound.

Additionally, manufacturers do not have to be concerned about ambient temperature variation, compound shear history or variations in supply pressure as the conditioner maintains the compound at a level temperature, pressure and viscosity.

It is known that changes in ambient air temperatures can cause a fluctuation in the film weight obtained from a system. In general, the film weight will vary by about 1%/°F. from the desired weight. Therefore, a change in temperature of 20° F. during the course of a day, which is not uncommon in most parts of the world, would result in a deviation in film weights of up to 20%.

Likewise, a change in line pressure is known to affect the film weight. In general, a change of 1 psi will cause about a 4% change in the film weight obtained, when the lining pressure is in the range of 20 to 30 psi, which is typical of commercial conditions.

Compound viscosity is affected by shear history, especially shutdowns, which can occur randomly or during scheduled maintenance checks or on weekends.

The present invention is unique in that it controls the effects of pressure, temperature and shear history (since the most recent shear history is dominant on the system) and provides consistent film weights despite changes in the ambient temperature, supply pressure or shear history. It has been determined that the present invention allows control of compound temperature to within +/− 1° F. of the desired temperature. Additionally, the present invention allows control of compound lining pressure to within +/− 0.5 psi of the desired pressure level when the lining pressure is in the range of 20-30 psi. With such sensitive control, the present invention has been able to negate the effects of ambient temperature, supply pressure and shear history on the film weight of the compound.

Additionally, the present invention allows the can end manufacturer to vary the temperature of the compound within the system and gain additional control in adjusting proper placement of the compound on the can end. Varying the temperature of the compound within the system changes its viscosity and thus provides a different flow out of the compound as it is lined on the can end. In this manner placement of the compound on the can end can be altered by varying the temperature in the system.

The present invention also allows the compound manufacturer greater latitude in selecting the flow characteristics of the compound. Compound is preferably manufactured with a yield value so that the various components of the compounds do not settle out during transportation and storage. Unfortunately, the yield value may effect the flow of the compound at moderate and high shear rates as occur in the supply piping and lining nozzles. Compounds generally represent a balance between the characteristics at low shear rates, moderate and high shear rates. Compound manufacturers cannot make large changes in the characteristics of the compound at low shear rates without potentially affecting the characteristics at moderate or high shear rates.

The present invention, due to its control of temperature and pressure and shearing action, allows the compound manufacturer to vary the low shear rate characteristics to a greater extent as the system allows the can end manufacturer to vary the viscosity of the compound in the system to a desired value.

The present invention, due to its ability to provide consistent film weights, allows the can end manufacturer to reduce the target film weight of the compound without risk of rejecting increased numbers of can ends. As film weights currently vary by +/− 15%, a target film weight must be at least 15% higher than desired so as to compensate for low film weight deposition. As the present invention provides a means for accurately controlling film weights, the can end manufacturer may reduce his target film weight significantly without adversely affecting rejection rate, thus increasing profitability.

In summation, the system, without any specific damping means, is capable of damping the pressure fluctuations of the system to an extent that film weight can be controlled to within +/− 5% of the desired weight. This is a two fold improvement in film weight control over that currently achieved in solvent compound systems and a three fold improvement in film weight control over that currently achieved in water based compound systems.

With the use of at least one damping means, the system provides film weights within +/− 3% of the desired weight. When both damping means are used, the film weight is controlled to within +/− 3% of the desired weight, and additional advantages are obtained, such as reduction in the water hammer effect with a pressurized feed, thus extending pump life. The use of the one or more dampeners represents a five fold improvement in the ability to control film weights as compared to that currently achieved with water based compound systems.

While the present invention has been disclosed with reference to its preferred embodiments, other embodiments can achieve the same result. Variations and modifications of the present invention will be obvious to those skilled in the art and it is intended in the appended claims to cover all such modifications and equivalents as fall within the true spirit and scope of this invention.

What is claimed:

1. A conditioning system for water based compounds comprising an inlet means for connecting the system to a supply of compound, a first pressure regulation means for compensating variations in the supply pressure, the first pressure regulation means being adjacent to and downstream from the inlet means, a pumping means for circulating the compound through the system, a means for filtering coagulum, a means for controlling the temperature of the compound, a connection means for attaching the system to one or more lining nozzles, a second connection means for attaching the system to an exit port of the one or more lining nozzles, a second pressure regulation means for adjusting the lining pressure as well as for compensating variations in the pressure of the system, and a return means connected between the first pressure regulation means and the pumping means so as to allow for the recirculation of compound through the system.

2. The conditioning system of claim 1 further comprising one or more means for damping pressure variations in the system and one or more means for sensing the pressure within the system.

3. The conditioning system of claim 2 wherein the means for damping pressure variations is a pressure dampener and the means for sensing the pressure is a pressure gauge.

4. The conditioning system of claim 2 wherein a means for damping pressure variations in the system is located between the pumping means and the means for filtering coagulum, a first means for sensing pressure within the system is located between the first regulation means and the pumping means and a second means for sensing pressure within the system is located between the second connection means and the second pressure regulation means.

5. The conditioning system of claim 1 wherein the first pressure regulation means is a downstream pressure regulator, the pumping means is a double diaphragm pump, the means for filtering is a filter, the means for controlling the temperature of the compound is a heater with a variable temperature control, the second pressure regulation means is a back pressure regulator and the return means is a connector attached to the inlet side of the pumping means.

6. The conditioning system of claim 1 wherein the system controls film weight of the compound to within +/− 5% of the desired weight.

7. The conditioning system of claim 1 wherein the system controls film weight of the compound to within +/− 3% of the desired weight.

8. A conditioning system for a water based compound comprising an inlet for connection to a supply of compound, a downstream pressure regulator adjacent the inlet, a first pressure gauge downstream of the regulator, a diaphragm pump, a first pressure dampener connected to an outlet of the pump, a filter connected between the first dampener and a heater, the heater having a controller for varying the temperature of the compound as it flows through the heater, an outlet from the heater being attached to an inlet port of one or more lining nozzles, a connector attached to an outlet port of the nozzles, a second pressure gauge being connected downstream from and adjacent to the outlet port, a back pressure regulator connected downstream from the second pressure gauge, a second pressure dampener connected to the downstream side of the back pressure regulator and a return line connecting the dampener to a portion of the system between the downstream pressure regulator and the pump.

9. The system of claim 8 wherein the pump is a double diaphragm pump.

10. The system of claim 8 wherein the dampeners are air activated, automatically controlled bladder type dampeners.

11. The system of claim 8 wherein the heater is a polytetrafluoroethylene lined hose enclosed within a heated jacket.

12. The system of claim 8 wherein the system controls film weights of the lined compounds to within +/− 5% of the desired film weight.

13. The system of claim 8 wherein the system controls film weights of the lined compounds to within +/− 3% of the desired film weight.

* * * * *